(12) United States Patent
Huang et al.

(10) Patent No.: US 7,351,343 B2
(45) Date of Patent: Apr. 1, 2008

(54) COPPER METAL RECOVERY SYSTEM

(75) Inventors: Shen-Tsung Huang, Taipei (TW); Ta-Chiang Chang, Taipei (TW)

(73) Assignee: Chiu-Hsiung Chang, Taipei (TW)

( * ) Notice: Subject to any disclaimer, the term of this patent is extended or adjusted under 35 U.S.C. 154(b) by 282 days.

(21) Appl. No.: 11/111,238

(22) Filed: Apr. 22, 2005

(65) Prior Publication Data

US 2006/0213839 A1  Sep. 28, 2006

(30) Foreign Application Priority Data

Mar. 23, 2005   (TW) ............................... 94109130 A

(51) Int. Cl.
*C02F 1/62* (2006.01)
*C02F 101/20* (2006.01)

(52) U.S. Cl. ...................... 210/712; 210/724; 210/737; 210/912; 210/919; 216/93; 423/27; 423/35; 423/43

(58) Field of Classification Search ................. 210/724
See application file for complete search history.

(56) References Cited

U.S. PATENT DOCUMENTS

| 4,428,773 | A | * | 1/1984 | Krotz ............................ 75/721 |
| 5,560,838 | A | * | 10/1996 | Allies et al. ................... 216/93 |
| 6,254,783 | B1 | * | 7/2001 | Wurzburger et al. ........ 210/724 |
| 6,274,045 | B1 | * | 8/2001 | Kreisler ....................... 210/710 |
| 6,649,131 | B2 | * | 11/2003 | Seo et al. ...................... 423/42 |
| 2006/0278583 | A1 | * | 12/2006 | Hsiao et al. ................ 210/710 |

* cited by examiner

*Primary Examiner*—Peter A. Hruskoci

(57) ABSTRACT

The present invention generally relates to a copper metal recovery system, able to integrate with a waste treatment system of a circuit board manufacture plant, includes a stirring unit, a crystallization unit and a pressure filtering unit. More than 2 parts of weight of acidic copper-containing etching process effluent, less than 1 parts of weight of copper-containing slurry, and less than 1 part of weight of waste mixture of an acidic copper-containing photolithography effluent and an acidic frame etching effluent are charged into the stirring unit to conduct decomposition. Alkaline hydroxide reacts with decomposition products in the crystallization unit. The temperature of the crystallization unit is at least 80° C. The pressure filtering unit outputs a copper hydroxide solution or a copper oxide solution.

10 Claims, 1 Drawing Sheet

COPPER METAL RECOVERY SYSTEM

FIELD OF THE INVENTION

The present invention relates to a copper metal recovery system and a copper metal recovery process, and more particularly to a copper metal recovery system integrated with a circuit board manufacture plant, and a copper metal recovery process integrated with a circuit board manufacture plant.

DESCRIPTION OF THE RELATED ART

As popularization and development of electronics go, the market value of circuit boards which are used in the electronics has exceeded over thousands dollars. However, chemicals and materials used for the manufacture of the circuit board produce a lot of poisonous wastes in either liquid form or solid form, in which heavy metals such as copper, lead or nickel are contained. If such great amount of heavy metals cannot be well treated, then serious environmental pollution will occur to endanger human's health.

Regarding to the treatment of copper-containing wastewater or wastes, the wastes from the manufacture of the circuit board is de-watered and neutralized to meet environmental protection regulations. That means the wastes do not disappear, but change its water content or pH value to reduce the impact to the environment. On the hand, the manufacturer must give the wastewater or wastes to external professional waste treatment companies for further treatment, which increases the waste treatment cost. As wastes accumulate continuously, how to reduce the formation of the wastes or recycle the wastes becomes more critical to the environmental protection.

The circuit board manufacturer uses a lot of metal copper, while part of copper will be washed out in etching and development processes. In other words, the wastewater or wastes coming from circuit board manufacturers are rich in copper content. Copper contained in the wastewater or wastes must be converted to copper oxide or copper hydroxide that has high market value. However, there is no approach to effectively convert copper in the wastewater or wastes into copper oxide or copper hydroxide with any output of slurries. In view of economics, there is a need of a process to convert copper in the wastewater or wastes into copper oxide or copper hydroxide so that the wastes can be recycled without any output of slurries which require further treatment.

SUMMARY OF THE INVENTION

Therefore, it is object of the invention to provide a copper metal recovery system, which can be integrated with a circuit board manufacture plant without any change in the arrangement of the elements of as originally installed in the circuit board plant. The wastewater or waste liquid generated from the manufacture process can be directly charged into the copper metal recovery system from the circuit board manufacture plant. With the use of the copper recovery system of the invention, there is no secondary pollution.

It is another object of the invention to provide a copper metal recovery system, integrated with a circuit board manufacture plant, in which copper ions in the copper-containing wastewater or waste liquid are converted into copper oxide or copper hydroxide which are high value.

In order to achieve the above and other objectives of the invention, the copper metal recovery system of the invention, integrated with the circuit board manufacture plant, includes a stirring unit, a crystallization unit and pressure filtering unit.

The stirring unit is connected to an exit of an existing wastewater treatment system of a circuit board manufacture plant. More than 2 parts of weight of acidic copper-containing etching process effluent, less than 1 parts of weight of copper-containing slurry, and less than 1 part of weight of waste mixture of acidic copper-containing photolithography effluent and acidic frame etching effluent are charged into the stirring unit.

The temperature of the crystallization unit is at least 80° C.

The pressure filtering unit is connected to an input end of the existing wastewater treatment system of the circuit board manufacture plant. To an exit of the pressure filtering unit are connected a solid pipeline and a filtrate pipeline. The filtrate pipeline is connected to an input end of the existing wastewater treatment system of the circuit board manufacture plant so that the filtrate can be feedback to the existing wastewater treatment system.

According to another aspect of the invention, a copper recovery process is provided, which can be integrated with the existing wastewater treatment system of the circuit board manufacture plant. The process includes a decomposition step, a crystallization step and a pressure filtering step.

At the decomposition step, more than two parts of acidic copper-containing etching process effluent, less than 1 parts of weight of copper-containing slurry, and less than 1 part of weight of waste mixture of acidic copper-containing photolithography effluent and acidic frame etching effluent are mixed.

At the crystallization step, alkaline hydroxide such as sodium hydroxide, potassium hydroxide, liquid alkaline and solid alkaline is added to react with decomposition products obtained at the decomposition step to obtain a solution. The obtained solution is copper hydroxide solution or copper oxide solution.

At the pressure filtering step, after the obtained solution is filtered with a predetermined pressure to obtain a solid and a filtrate. The solid is copper hydroxide or copper oxide.

The foregoing is a summary and shall not be construed to limit the scope of the claims. The operations and structures disclosed herein may be implemented in a number of ways, and such changes and modifications may be made without departing from this invention and its broader aspects. Other aspects, inventive features, and advantages of the invention, as defined solely by the claims, are described in the non-limiting detailed description set forth below.

DETAILED DESCRIPTION OF THE EMBODIMENT(S)

Figure 1:
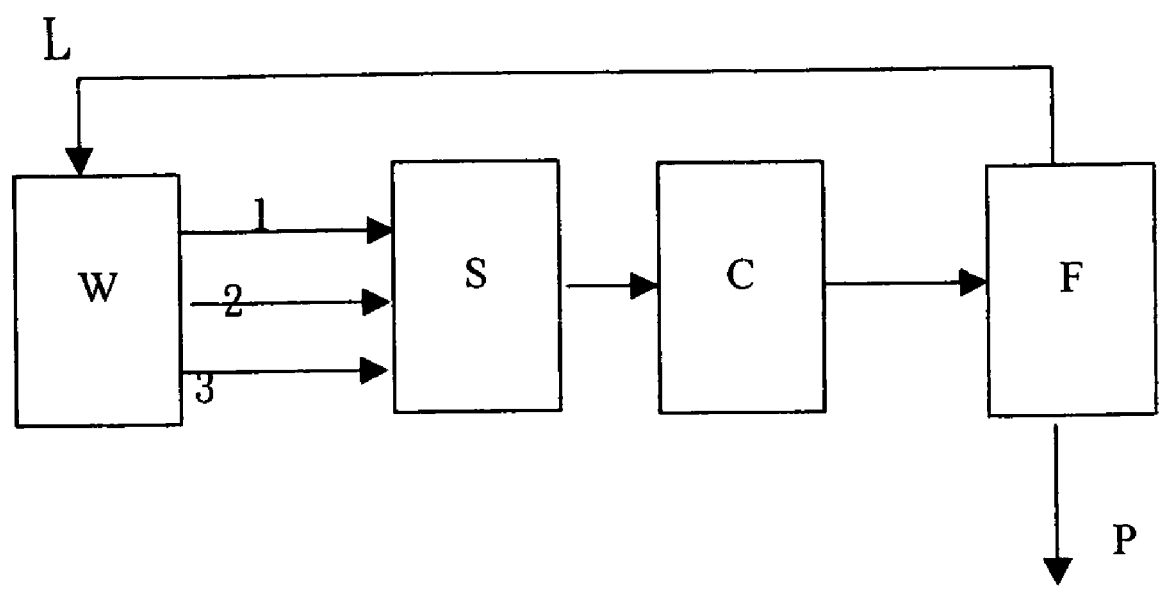
FIG. 1 is a schematic flowchart of a copper metal recovery system according to one embodiment of the invention.

A typical circuit board manufacture process includes brushing, curing of etching resister, etching after curing of etching resister, etchant removal, black/brown oxidation, hole drilling, de-smearing, through hole plating, curing of plating resister, circuit plating, solder plating, plating resister stripping and copper etching, solder stripping, solder mask printing, nickel plating and gold plating, and hot air leveling.

Etchants used to etch an inner layer and an outer layer of a circuit board includes ion chloride, copper chloride, ammonium chloride and ammonia. The waste liquid generated in this etching process includes ion chloride, copper chloride and ammonium chloride. Through hole plating includes hole trimming, photolithography, activation, and copper deposition. Compounds used in the photolithography process include sulfur acid/hydrogen peroxide, sodium persulfate and ammonium persulfate. Compounds used in the copper deposition include copper salts such as copper sulfate, reductant formaldehyde, EDTA or tartaric acid salt chelating agent and sodium hydroxide pH controller.

The wastewater or waste liquid to be treated in the copper metal recovery system of the invention comes from an acidic copper-containing etching process effluent, a copper-containing slurry, an acidic copper-containing photolithography effluent, and an acidic frame etching effluent. The copper-containing slurry is obtained by de-hydrating a main stream of copper-containing effluents from a copper process and contains not less than 1% of copper. The acidic copper-containing etching process effluent is generated by etching the inner and outer layers of the circuit board and contains not less than 8% of copper. The acidic copper-containing photolithography effluent is generated by a photolithography process and contains not less than 0.1% of copper. The acidic frame etching effluent comes from a frame process. The copper process, the acidic etching process, the photolithography process and the frame process are well known in the art and therefore the detailed descriptions thereof can be omitted.

The main stream of wastes from the copper process are charged into a pH value adjustment tank to adjust the waste to pH 2-3. Iron chloride or polyvalent aluminum chloride is added into the pH adjustment tank with stirring. Then the acidized waste is charged into a alkaline tank in which the pH value of the waste is adjusted to 8-10 to form a hydroxide suspension. A polymer precipitant is added to speed up the deposition of particles in the suspension. Deposited aggregates forms on the bottom of the alkaline tank and is extracted to a concentration tank for further concentration. Finally, the concentrated aggregates are pressed by a press to form the copper-containing slurry with about 70% of moisture and about 7% of copper, and an upper liquid part. The upper liquid part is discharged after being adjusted to pH 6-9.

The acidic copper-containing etching process effluent contains copper chloride, hydrogen peroxide and hydrogen chloride, for example. The pH value of the acidic copper-containing etching process effluent is smaller than 0.5.

The acidic copper-containing photolithography effluent contains hydrogen peroxide and sulfuric acid, for example. The pH value of the acid copper-containing photolithography effluent is smaller than 1.5.

The acidic frame etching effluent contains such as hydrogen peroxide and nitric acid. The pH value of the acid copper-containing photolithography effluent is smaller than 1.3.

FIG. 1 is a schematic view of a copper metal recovery system according to one preferred embodiment of the invention.

Referring to FIG. 1, the copper metal recovery system of the invention includes a stirring unit S, a crystallization unit C and a pressure filtering unit F. The copper metal recovery system of the invention can be integrated with an existing wastewater treatment system W of a circuit board manufacture plant. In the stirring unit S, more than 2 parts of weight of acidic copper-containing etching process effluent 2, less than 1 parts of weight of copper-containing slurry 1, and less than 1 part of weight of waste mixture 3 of acidic copper-containing photolithography effluent and acidic frame etching effluent are charged. The acidic copper-containing etching process effluent, the copper-containing slurry, and the waste mixture of acidic copper-containing photolithography effluent and acidic frame etching effluent-all come from the manufacture process of the circuit board manufacture plant in situ.

The temperature of the crystallization unit C is at least 80° C.

The pressure filtering unit F has a solid pipeline P and a filtrate pipeline L at one of its exits. The filtrate pipeline L connects to an input end of the existing wastewater treatment system W of the circuit board manufacture plant so that the filtrate can be used to adjust the pH value of the waste inside the existing wastewater treatment system W.

According to another embodiment of the invention, which illustrates a process of recovering copper metal from the waste of the circuit board manufacture plant using the copper metal recovery system of the invention, more than 2 parts of weight of acidic copper-containing etching process effluent 2, less than 1 parts of weight of copper-containing slurry 1, and less than 1 part of weight of waste mixture 3 of acidic copper-containing photolithography effluent and acidic frame etching effluent are charged into the stirring unit S from an exit of the existing wastewater treatment system W of the circuit board plant. The pasty copper-containing slurry 1 turns into liquid state. Acids contained in the acidic copper-containing etching process effluent, the copper-containing slurry, and the waste mixture of acidic copper-containing photolithography effluent and an acidic frame etching effluent decompose polymers contained in the untreated copper-containing slurry 1 into suspended particles and a decomposition suspension.

The decomposition suspension obtained may be charged into a stock storage tank for the subsequent use.

The acidic copper-containing etching process effluent 2, less than 1 parts of weight of copper-containing slurry 1, and less than 1 part of weight of waste mixture 3 of acidic copper-containing photolithography effluent and acidic frame etching effluent are referred as a stock to be treated. At the ratio of 1-2.5:5 of alkaline to the stock, alkaline hydroxide such as sodium hydroxide and potassium hydroxide in the form of liquid or solid is charged into the crystallization unit C. The temperature of the crystallization unit increases to about 80° C. because of spontaneous exothermic reaction. It is preferred to keep the temperature of the crystallization unit at least about 80° C. during the reaction. Stirring continues about at least 1 hour, preferably about 2 hours. The concentration of alkaline hydroxide is more than 20%, preferably about 20-50%. During the reaction, the pH value is controlled not to be smaller than 9 with the use of pH value controller or sensor. If the pH value is higher than 9, the stock is added to maintain the pH value in a steady range.

Crystallization generates copper oxide or copper hydroxide, depending on the sequence of charging the stock and the alkaline. If the alkaline is charged before the stock, then black copper oxide is obtained. On the other hand, if the alkaline is charged after the stock, then copper hydroxide aqueous solution of water blue color is obtained. In the light of economics, copper oxide has higher market value than copper hydroxide. Therefore, it is preferred to add the alkaline before the stock.

Subsequently, copper oxide solution or copper hydroxide solution is pressure filtered to obtain a filtrate and a solid. The filtrate is fed back to the wastewater treatment system W of the circuit board manufacture plant. The solid is copper oxide or copper hydroxide. In the case of copper oxide, the water content is 50-60% and copper content is 26%-32%.

EXAMPLE 400 g of 10% Cu acidic copper-containing etching process effluent, 100 g of 7% Cu copper-containing slurry, and the waste mixture of 100 g of 4% Cu acidic copper-containing photolithography effluent and 100 g of 2% Cu acidic frame etching effluent are charged into the stirring unit to conduct the decomposition for about 4 hours. 245 g of 45% sodium hydroxide is charged into the crystallization unit and then decomposition products are charged into the crystallization unit to conduct the crystallization for about 2 hours. After pressure filtering step, 158 g of copper oxide with 32% Cu and 55% water, and 780 g of filtrate including NaCl, $Na_2SO_4$, and $NaNO_3$ are obtained.

As described above, the copper metal recovery system of the invention uses only the wastes produced by the circuit board manufacture plant itself as waste treatment agents and does not output any secondary wastes which would need further treatment. Furthermore, copper oxide or copper hydroxide obtained from the copper metal recovery system of the invention will add profit to the manufacture. The most distinguishable feature of the copper metal recovery system of the invention is that all the wastes drained from the manufacture plant can be treated in situ without change the existing wastewater treatment system, which greatly reduces the waste treatment cost compared to the prior art, while can increase the profit by recovery of the copper oxide.

Realizations in accordance with the present invention have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of the invention as defined in the claims that follow.

What is claimed is:

1. A copper metal recovery process, integrated with a wastewater treatment system of a circuit board manufacture plant, comprising:

a decomposition step of charging from an exit of the wastewater treatment system of the circuit board plant more than 2 parts of weight of acidic copper-containing etching process effluent, less than 1 part of weight of copper-containing slurry, and less than 1 part of weight of waste mixture of acidic copper-containing photolithography effluent and acidic frame etching effluent into a stirring unit to obtain decomposition products, wherein the acidic copper-containing etching process effluent, the copper-containing slurry and the waste mixture discharged from the exit of the wastewater treatment system are used as a stock to be treated, the decomposition step includes the decomposition of polymers contained in the copper-containing slurry by acids in the acidic effluents, and the decomposition products includes a decomposition suspension containing suspended particles and copper ions;

a crystallization step utilizing a temperature of at least 80° C. and a pH not smaller than 9 of reacting alkaline hydroxide with the decomposition products to obtain a crystallization solution; and a pressure filtering step of pressure filtering the crystallization solution to obtain a solid including copper oxide or hydroxide and filtrate.

2. The process of claim 1, wherein at the crystallization step, the alkaline hydroxide is added to a crystallization unit before the decomposition products are added so as to obtain the solid as the copper oxide at the pressure filtering step.

3. The process of claim 1, wherein at the crystallization step, the decomposition products are added to a crystallization unit before the alkaline hydroxide is added so as to obtain the solid as the copper hydroxide at the pressure filtering step.

4. The process of claim 1, wherein the copper-containing slurry is decomposed into liquid at the decomposition step.

5. The process of claim 1, wherein a ratio of the alkaline hydroxide and the stock to be treated is 1-2.5:5.

6. The process of claim 1, wherein the crystallization is performed for at least 2 hours.

7. The process of claim 1, wherein at the decomposition step, stirring continues for 2 hours to 24 hours.

8. The process of claim 1, wherein the alkaline hydroxide used in the crystallization includes NaOH and/or KOH in either liquid or solid form.

9. The process of claim 1, wherein a concentration of the alkaline hydroxide used in the crystallization step is more than 20%.

10. The process of claim 1, wherein the filtrate is fed back to the wastewater treatment system of the circuit board manufacture plant so that the filtrate is used to adjust a pH value of the wastewater treatment system.

* * * * *